(12) United States Patent
Hong et al.

(10) Patent No.: US 11,775,042 B2
(45) Date of Patent: Oct. 3, 2023

(54) METHOD, APPARATUS AND SYSTEM FOR MANAGING ENERGY IN SELF-POWERED NETWORK

(71) Applicant: UNIVERSITY-INDUSTRY COOPERATION GROUP OF KYUNG HEE UNIVERSITY, Yongin-si (KR)

(72) Inventors: Choong Seon Hong, Yongin-si (KR); Md Shirajum Munir, Suwon-si (KR); Do Hyeon Kim, Yongin-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 184 days.

(21) Appl. No.: 17/002,530

(22) Filed: Aug. 25, 2020

(65) Prior Publication Data

US 2022/0066526 A1 Mar. 3, 2022

(30) Foreign Application Priority Data

Aug. 25, 2020 (KR) .......................... 10-2020-0106769

(51) Int. Cl.
*G06F 1/00* (2006.01)
*G06F 11/30* (2006.01)
*G06F 1/28* (2006.01)
*G06N 3/08* (2023.01)

(52) U.S. Cl.
CPC ................ *G06F 1/28* (2013.01); *G06N 3/08* (2013.01)

(58) Field of Classification Search
CPC .................................. G06F 1/28; G06N 3/08
See application file for complete search history.

(56) References Cited

U.S. PATENT DOCUMENTS

| | | | |
|---|---|---|---|
| 2013/0122885 A1* | 5/2013 | Kojima | G05B 23/0251 455/418 |
| 2019/0019082 A1* | 1/2019 | Dasgupta | G06N 3/0454 |
| 2019/0114569 A1* | 4/2019 | Palmer, II | G06Q 30/0279 |

(Continued)

FOREIGN PATENT DOCUMENTS

| | | |
|---|---|---|
| JP | 2013-106202 A | 5/2013 |
| KR | 10-2020-0084431 A | 7/2020 |

*Primary Examiner* — Mohammed H Rehman
(74) *Attorney, Agent, or Firm* — Studebaker & Brackett PC

(57) ABSTRACT

Provided are an energy management method in a self-powered network, and an energy management apparatus and an energy management system to perform the method. The energy management system includes a first energy management unit and at least one second energy management unit configured to be communicable with the first energy management unit. Here, the at least one second energy management unit may acquire observation data using collected data and may transmit the acquired observation data to the first energy management unit, the first energy management unit may acquire a global neural network parameter by performing learning based on the observation data and may transfer the neural network parameter to the second energy management unit, and the at least one second energy management unit may determine an energy dispatch by performing learning using the neural network parameter and the collected data.

17 Claims, 4 Drawing Sheets

(56) References Cited

U.S. PATENT DOCUMENTS

| | | | |
|---|---|---|---|
| 2019/0371348 A1* | 12/2019 | Shahbazi Mirzahasanloo | ............ H04W 84/12 |
| 2020/0310898 A1* | 10/2020 | Yano | ................... G06F 11/3075 |
| 2021/0127140 A1* | 4/2021 | Hannuksela | ........... H04N 19/85 |
| 2021/0133292 A1* | 5/2021 | Ostrowski | ............... G06F 30/20 |
| 2022/0007084 A1* | 1/2022 | Aytekin | ................. G06N 3/084 |

\* cited by examiner

METHOD, APPARATUS AND SYSTEM FOR MANAGING ENERGY IN SELF-POWERED NETWORK

CROSS-REFERENCE TO RELATED APPLICATION

This application claims priority from Korean Patent Application No. 10-2020-0106769 filed on Aug. 25, 2020 in the Korean Intellectual Property Office, and all the benefits accruing therefrom under 35 U.S.C. 119, the contents of which in their entirety are herein incorporated by reference.

TECHNICAL FIELD

At least one example embodiment relates to an energy management method in a self-powered network and an apparatus and system to perform the method.

RELATED ART

Mobile edge computing (MEC) refers to computing technology capable of controlling a device by immediately processing data collected by the device (a terminal, a sensor, etc.) using the device itself or another apparatus around the device and by acquiring results corresponding thereto. Compared to conventional centralized processing, MEC may relatively quickly and appropriately process data and may also prevent overloading of a central computer apparatus. Due to such advantages, there is an increasing interest in MEC and MEC is expected to apply in various fields, such as a wireless network. To stably apply MEC technology to a network, sufficient energy (power) needs to be stably supplied to the network. Also, although sufficient energy is stably supplied to the network, significantly large cost may be used. In this case, it cannot be said that energy is efficiently managed. In particular, using a large amount of fossil fuels greatly affects an increase in network operation cost. Accordingly, for stable energy supply and cost reduction, an alternative energy generation source (e.g., a solar cell, a wind power generator, etc.) for supplying alternative energy, such as renewable energy, may be further added to a wireless network. Using such a self-power generation source, energy may be internally produced in the wireless network. However, the use of the self-power generation source causes uncertainty in both energy demand and energy production within the network. This is because an amount of resources (communication, computation, etc.) required for providing a service or an energy generation pattern or an energy production amount of the self-power generation source is variable and difficult to predict. Due to such uncertainty in energy demand and production patterns, it is difficult to perform optimal energy management. In particular, the conventional energy management model simply considers only energy management and user task offload about network resource allocation and does not consider random demand for computing, resource demand of a mobile edge application, communication requirements of a service, and the like, and thus has difficulty in optimally managing energy. Therefore, in the field of MEC technology using renewable energy, there is a need to design an appropriate energy dispatch that may efficiently and appropriately distribute energy being supplied and optimally use the distributed energy, and an energy management method according thereto.

DETAILED DESCRIPTION

Technical Subject

An aspect of the present disclosure is to provide an energy management method in a self-powered network that may minimize energy consumption cost of a network by guaranteeing an efficient energy dispatch and may also provide smooth flow of energy to be suitable for a network infrastructure even in an uncertain environmental situation, and an apparatus and system to perform the method.

Technical Solution

To outperform the aforementioned issues, there are provided an energy management method, and an energy management apparatus and an energy management system to perform the method.

An energy management system may include a first energy management unit; and at least one second energy management unit configured to be communicable with the first energy management unit. Here, the at least one second energy management unit may be configured to acquire observation data using collected data and to transmit the acquired observation data to the first energy management unit, the first energy management unit may be configured to acquire a global neural network parameter by performing learning based on the observation data, and to transfer the neural network parameter to the second energy management unit, and the at least one second energy management unit may be configured to determine an energy dispatch by performing learning using the neural network parameter and the collected data.

The at least one second energy management unit may be configured to select a status based on the collected data, to determine an action and a reward corresponding to the action by performing learning based on the selected status, and to transmit the action and the reward to the first energy management unit.

The at least one second energy management unit may be configured to estimate at least one of a value function, an advantage function, and a policy gradient.

The at least one second energy management unit may be configured to iteratively acquire observation data during a predetermined time slot and to transmit, to the first energy management unit, observation data of an end point in time when the time slot ends.

The first energy management unit may be configured to determine a global energy dispatch policy or evaluate a policy loss.

The energy management system may include at least one of at least one base station unit configured to connect to the at least one second energy management unit, to communicate with an external apparatus, and to consume energy; and an energy generator configured to connect to the at least one second energy management unit and to produce alternative energy.

The first energy management unit may be configured to connect to at least one of at least one base station unit that consumes energy for communication with an outside and an energy generator that generates alternative energy, to perform learning using data collected from at least one of the base station unit and the energy generator, to acquire a global neural network parameter by performing learning based on information acquired according to learning performance, and to determine an energy dispatch by performing learning using the neural network parameter.

An energy management apparatus may include a communicator configured to receive observation data from an external energy management apparatus; and a processing unit configured to acquire an optimized neural network parameter for a learning algorithm about determination of an energy dispatch policy based on the observation data. Here, the communicator may be configured to transmit the neural network parameter to the external energy management apparatus.

The processing unit may be configured to acquire the optimized neural network parameter by evaluating a gradient of a policy loss function.

An energy management apparatus may include a data collector configured to collect data about production and demand of energy; a processing unit configured to acquire observation data based on the data collected by the data collector; and a communicator configured to transmit the observation data to an energy management apparatus and to receive a neural network parameter from the external energy management apparatus. Here, the processing unit may be configured to perform learning using the neural network parameter.

The processing unit may be configured to select a status using the collected data and to determine an action and a reward corresponding to the action by performing learning based on the selected status.

The processing unit may be configured to iteratively acquire the observation data during a predetermined time slot, and the communicator may be configured to transmit the observation data to the external management apparatus after the time slot ends.

The processing unit may be configured to estimate at least one of a value function, an advantage function, and a policy gradient.

An energy management method may include collecting data about energy demand and production; acquiring observation data based on the data; acquiring a global neural network parameter used by a plurality of energy management apparatuses by further performing learning using the observation data; and determining an energy dispatch policy of each energy management apparatus by further performing learning using the global neural network parameter and the collected data.

The acquiring of the observation data based on the data may include selecting a status based on the data; and determining an action and a reward corresponding to the action by performing learning based on the selected status.

The acquiring of the observation data based on the data may further include estimating at least one of a value function, an advantage function, and a policy gradient.

The collecting of the data about the energy demand and production and the acquiring of the observation data based on the data during a predetermined time slot may be continuously repeated.

The collecting of the data about the energy demand and production and the acquiring of the observation data based on the data may be performed by a second apparatus, and the acquiring of the global neural network parameter used by the plurality of energy management apparatuses by further performing learning using the observation data may be performed by a first apparatus different from the second apparatus.

In this case, the energy management method may further include transmitting the observation data from the second apparatus to the first apparatus; and transmitting the global neural network parameter from the first apparatus to the second apparatus.

Effect

According to the aforementioned energy management method in a self-powered network and an apparatus and system to perform the method, it is possible to design an efficient and effective energy dispatch for a network (e.g., a wireless network).

According to the aforementioned energy management method in a self-powered network and an apparatus and system to perform the method, it is possible to reduce energy cost of a network based on an effective energy dispatch design and to further smoothly supply and transport energy in a wireless network according to a network infrastructure even in an uncertain environment. Accordingly, it is possible to reduce the risk of energy failure caused by the uncertain energy demand and generation in the self-powered wired or wireless network.

According to the aforementioned energy management method in a self-powered network and an apparatus and system to perform the method, since energy demand and generation patterns are not independent identically distributed (i.i.d.), it is possible to effectively process a dynamic environment even in a highly uncertain situation.

According to the aforementioned energy management method in a self-powered network and an apparatus and system to perform the method, it is possible to reduce a total amount and/or frequency of information exchange between the respective local apparatuses and thus, it is possible to reduce energy consumption or traffic according to data communication.

According to the aforementioned energy management method in a self-powered network and an apparatus and system to perform the method, it is possible to further efficiently perform learning and training for energy dispatch determination and, at the same time, to further improve the accuracy of learning for determination thereof. Also, it is possible to relatively reduce a computation time related to each local apparatus and thus, it is possible to improve the efficiency and reliability of energy dispatch determination.

According to the aforementioned energy management method in a self-powered network and an apparatus and system to perform the method, it is possible to guarantee the energy continuity of a network based on a high prediction accuracy and to reduce consumption of non-renewable energy.

MODE

Figure 1:
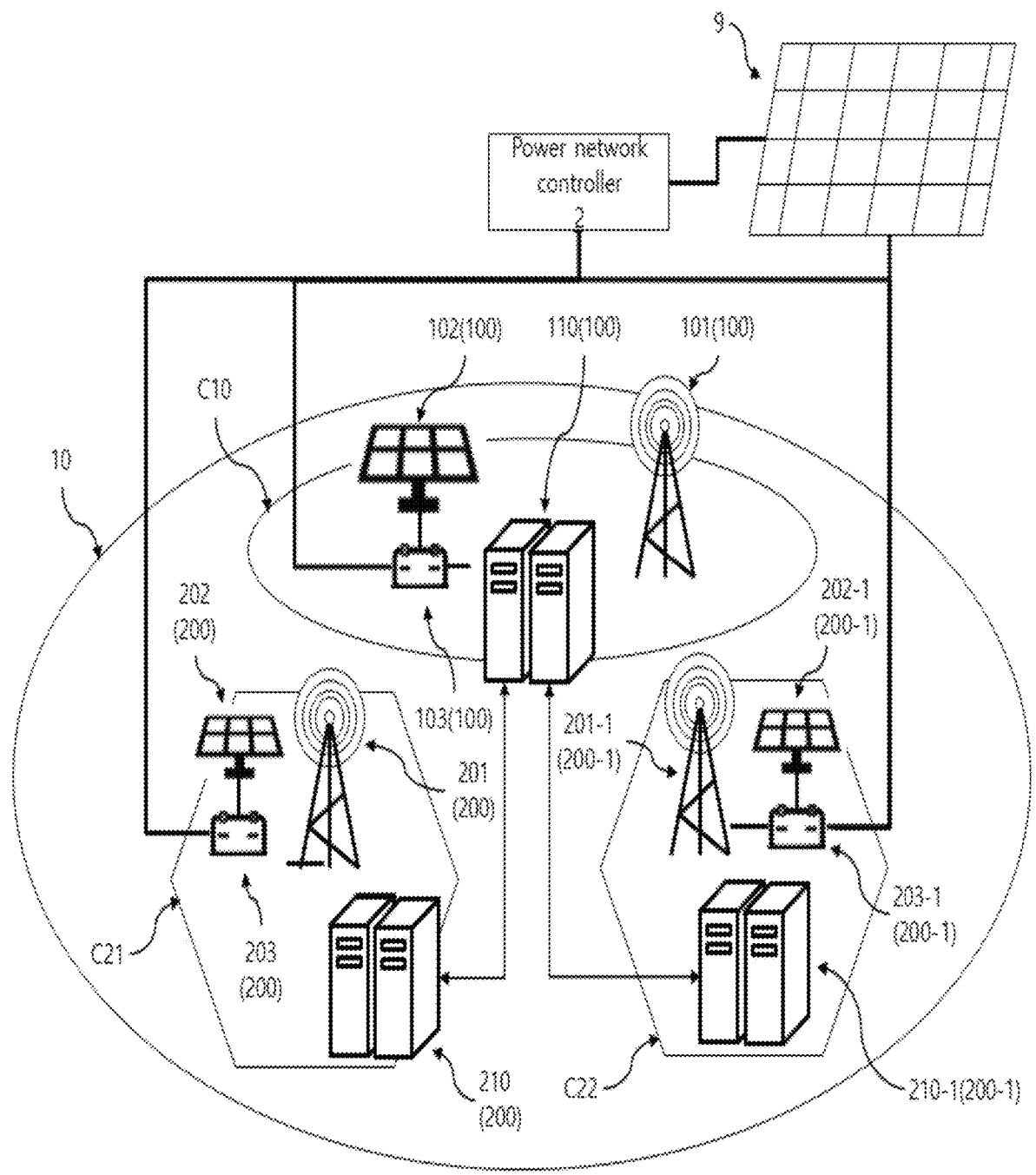
FIG. 1 illustrates an example embodiment of an energy management system 10.

Hereinafter, unless the context clearly indicates otherwise, like reference numerals refer to like elements used throughout. Also, components used herein, such as, for example, terms "-unit/module," etc., may be implemented as software or hardware. Depending on example embodiments, a single component with "-unit/module," etc., may be implemented as a single physical or logical part, or a plurality of components with "-unit/module," etc., may be implemented as a single physical or logical part, or a single component with "-unit/module," etc., may be implemented as a plurality of physical or logical parts.

When it is described that a single portion is connected to another portion throughout the present specification, it may indicate that a single portion is physically connected or electrically connected to the other portion. Also, when a single portion is described to include the other portion, it may include still another portion instead of excluding still other portion, unless the context clearly indicates otherwise.

Terms, such as first, second, and the like, may be used herein to describe components. Each of these terminologies is not used to define an essence, order or sequence of a corresponding component but used merely to distinguish the corresponding component from other component(s). Also, the singular forms "a," "an," and "the" are intended to include the plural forms as well, unless the context clearly indicates otherwise.

Hereinafter, example embodiments of an energy management system and an energy management apparatus are described with reference to FIGS. 1 to 3.

Figure 2:
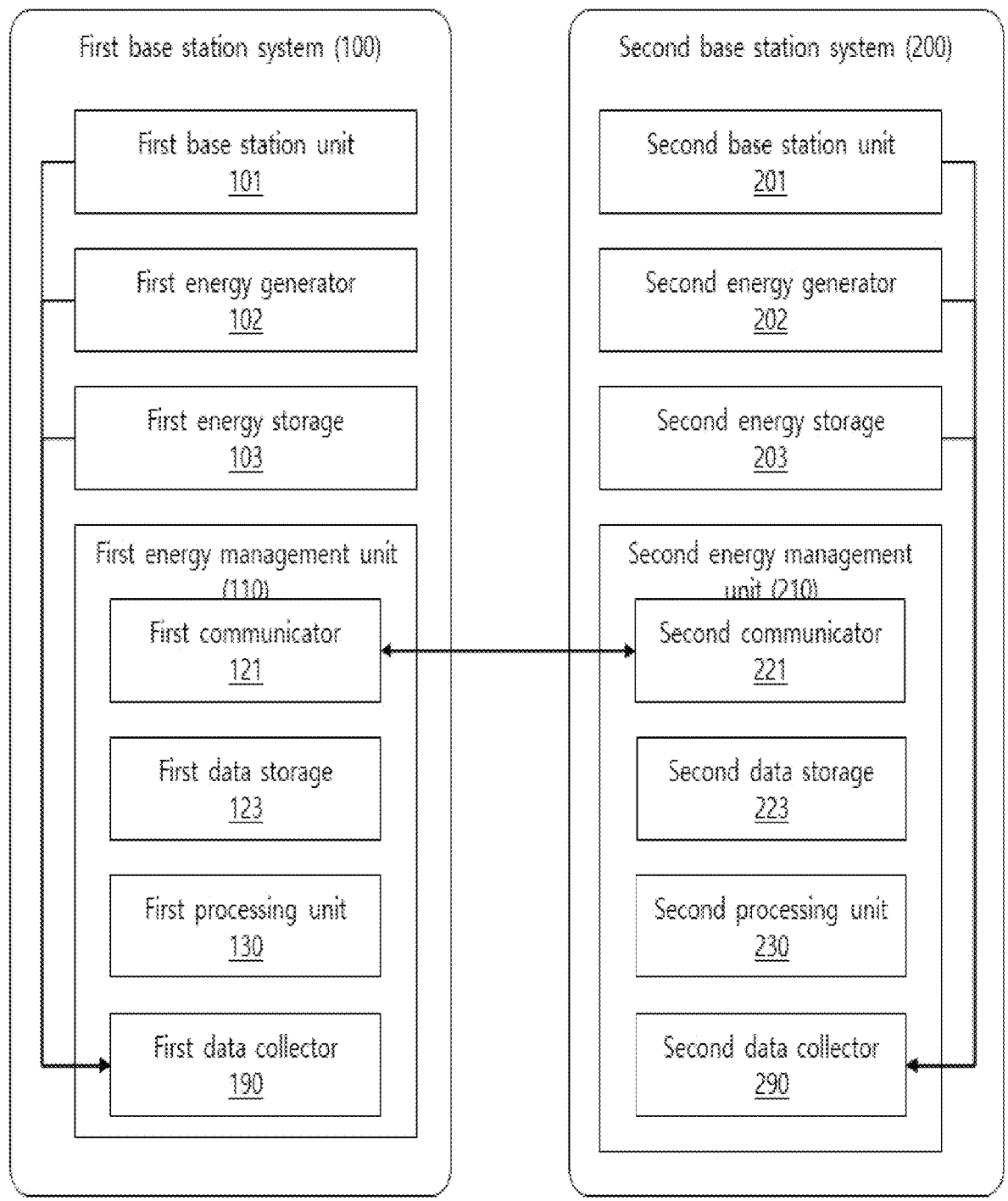
FIG. 2 is a block diagram illustrating an example embodiment of a first base station system and a second base station system.

FIG. 1 illustrates an example embodiment of an energy management system 10, and FIG. 2 is a block diagram illustrating an example embodiment of a first base station system and a second base station system.

Referring to FIG. 1, the energy management system 10 may include a plurality of base stations 100, 200, and 200-1 of which at least two are configured to be communicable with each other, and, in detail, may include a first base station system 100 including a relatively wide area (hereinafter, a first cell C10) and one or more second base station systems 200 and 200-1 including relatively narrow one or more areas (hereinafter, second cells C21 and C22), respectively. Here, the first cell C10 may include at least one of the second cells C21 and C22 or may not include any of the second cells C21 and C22. At least two of the plurality of second cells C21 and C22 may overlap, may be in contact, or may be spaced apart from each other.

The first base station system 100 and at least one of the second base station systems 200 and 200-1 are provided to communicate with each other. In this case, communication between the first base station system 100 and/or at least one of the second base station systems 200 and 200-1 may be performed based on a desired communication network. The desired communication network may include a wireless communication network, a wired communication network, or a wired and wireless communication network that is a combination thereof. Here, the wireless communication network may be implemented using at least one of a near field communication network and a mobile communication network. In response to communicable connection between the first base station system 100 and at least one second base station system 200, 200-1, the first base station system 100 may receive and acquire data from at least one of the second base station systems 200 and 200-1, may generate new data (e.g., a parameter for learning) based on the received data, and then may transmit the generated new data to at least one of the second base station systems 200 and 200-1. Depending on example embodiments, at least two second base station systems 200 and 200-1 may be provided to be communicable with each other. Accordingly, at least two second base station systems 200 and 200-1 may transmit and receive data necessary for each other or a control instruction.

Although FIG. 1 illustrates the energy management system 10 that includes a single first base station system 100 and two second base station systems 200 and 200-1, it is provided as an example only. Depending on example embodiment, the energy management system 10 may include at least two first base station systems 100. In this case, each of the second base station systems 200 and 200-1 may communicate with one of the at least two first base station system 100 based on predetermined settings, a selection from at least one of the at least two first base station systems 10, a selection from each of the second base station systems 200 and 200-1, or other various methods, and may determine an optimal energy dispatch based on the communication. Also, the energy management system 10 may include a single second base station system 200 or may include at least three second base station systems.

Referring to FIGS. 1 and 2, according to an example embodiment, the first base station system 110 may include a first base station unit 101, a first energy generator 102, a first energy storage 103, and a first energy management unit 110.

The first base station unit 101 may enable device-to-device communication by transmitting and receiving signals to and from an external communication device (e.g., a smartphone, a tablet personal computer (PC), a cellular phone, a radar device, a walkie-talkie, a handheld game console, a navigation device, a vehicle, and an artificial satellite) or another base station. In this case, the first base station 101 may also perform signal transmission and reception through electromagnetic waves or cables. Depending on circumstances, the first base station unit 101 may operate with energy generated by the first energy generator 102 and/or may operate with energy provided from an external power grid 9. The first base station unit 101 may also include a macro base station (MBS).

The first energy generator 102 may produce energy, for example, electrical energy, by itself and may supply the produced electrical energy to the first base station unit 101 to operate the first base station unit 101, or may transfer the produced electrical energy to the first energy storage 103 to transitorily or non-transitorily store the energy. Depending on example embodiments, the energy generated by the first energy generator 102 may be transferred to a power network controller 2 or the power grid 9 through a desired power cable. According to an example embodiment, the first energy generator 102 may include at least one apparatus (e.g., alternative energy power generator) capable of producing alternative energy. In detail, for example, the first energy generator 102 may include at least one of a solar power generator (a solar cell, etc.), a solar heat power generator, a wind power generator, a tidal power generator, a geothermal power generator, and/or a hydropower generator. In addition, the first energy generator 102 may also include various alternative energy production apparatuses. If the first energy generator 102 produces electrical energy using alternative fuel, an amount of energy produced by the first energy generator 102 may be inconsistent and may be variable according to a change in an ambient environment. For example, electrical energy produced by a wind power generator may continuously vary in response to a change in a wind direction or a wind speed. Such a change in electrical energy production may be unpredictable or significantly difficult to predict. Accordingly, the first base station system 110 may need to appropriately manage energy production and consumption. Meanwhile, depending on example embodiments, the first energy generator 102 may include a power generator (e.g., a thermal power generator) using fossil fuels.

The first energy storage 103 is configured to connect to the first energy generator 102 and to transitorily or non-transitorily store power generated by the first energy generator 102. Depending on example embodiments, the first energy storage 103 may connect to the power network controller 2 or the power grid 9, and may supply electrical energy to the power network controller 2 or the power grid 9 or, conversely, may be supplied with electrical energy from the power network controller 2 or the power grid 9. The first energy storage 103 may be implemented using, for example, a battery and the like.

The first energy management unit 110 may acquire data required for an operation of the first base station system 100 or the second base station system 200, may perform computational processing, or may generate necessary data and/or generate a control signal and transfer the data or the control signal to other apparatuses (e.g., 101 to 103, 200, and 200-1). In detail, for example, the first energy management unit 110 may collect at least one piece of information about the first base station system 100 or the second base station system 200 through a communication module or a sensor module, may transitorily or non-transitorily store the collected information, and may perform computation on the collected information, or may perform learning and training by applying a learning algorithm on the collected information, or may perform various types of determination and decision based on results of performing computation, learning, or training. Also, the first energy management unit 110 may control the other apparatuses (e.g., 101 to 103) by generating a control signal if necessary and by transmitting the control signal to the other apparatuses (e.g., 101 to 103) or another apparatus (not shown) connected thereto. In detail, for example, the first energy management unit 110 may control the apparatuses (e.g., 101 to 103) by determining various actions, such as whether energy generated by the first energy generator 102 is used, whether energy is stored, and/or whether energy is transmitted to the external power grid 9, and by generating a control signal corresponding to the determination and then transferring the generated control signal to the first energy generator 102 or transferring the generated control signal to an apparatus (e.g., a circuit) mounted to or electrically connected to the first energy storage 103.

The first energy management unit 110 may be implemented using at least one computing apparatus physically separate from the aforementioned first base station unit 101, first energy generator 102, and first energy storage 103. That is, the first energy management unit 110 may be a first energy management apparatus separately provided. In this case, the first energy management unit 110, that is, the first energy management apparatus may be implemented using, for example, a server computer, a desktop computer, a laptop computer, a smartphone, a cellular phone, a tablet PC, and a set-top box, or may be implemented using an electronic device specially designed for energy management.

Also, depending on example embodiments, the first energy management unit 110 may perform an edge computing function. For example, the first energy management unit 110 may provide a mobile edge computing service about another apparatus connected to the first base station 101, for example, a smartphone, such that processing results or information requested from the smartphone may be further quickly transferred. Depending on example embodiments, the edge computing function may be performed by another apparatus (e.g., a server apparatus) separately provided to be physically separate from the first energy management unit 110.

According to an example embodiment, the first energy management unit 110 may include a first communicator 121, a first data storage 123, and a first processing unit 130, and may further include a first data collector 190 depending on example embodiments.

The first communicator 121 may communicate with another external apparatus (e.g., the second base station system 200) through a wired communication network or a wireless communication network. The first communicator 121 may transmit and receive necessary data or commands/instructions by communicating with, for example, a second base station unit 201 and/or a second communicator 221. The first communicator 121 may be implemented based on an antenna or a communication circuit. Depending on example embodiments, the first communicator 121 may be omitted. In this case, the first base station unit 101 may be designed to communicate with the second base station system 200. In this case, the first base station unit 101 may inter-transfer data or an instruction through communication with the second base station unit 201 or the second communicator 221 of the second base station system 200.

The first data storage 123 may transitorily or non-transitorily store data transferred from the second base station system 200, result data acquired or updated by the meta processing unit 130, a learning algorithm (e.g., Long Short-Term Memory (LSTM)) required for learning or training, or at least one application (referable to as a program, an app, or software) required for energy management or operation control of the base station system 100. Here, the application may be directly generated and stored by a designer, may be transferred and stored from an external memory device through a data input/output (I/O) terminal, and may be acquired or updated through an electronic software distribution network accessible over a wired or wireless communication network. The data or the application stored in the first data storage 123 may be provided to the first processing unit 130 in response to a request from the first processing unit 130 and/or may be provided to the second base station system 200 in response to a request from the second base station system 200, for example, a second energy management unit 210. According to an example embodiment, the first data storage 123 may include at least one of a main memory device and an auxiliary memory device. Here, the auxiliary memory device may be implemented using at least one storage medium capable of recording data, such as, for example, a solid state drive (SSD), a hard disc drive (HDD), a secure digital (SD) card, a flash memory device, a compact disc (CD), and a DVD.

The first processing unit 130 may perform computation, learning, and data acquisition operations required for energy management. Also, the first processing unit 130 may perform computation and control operations related to the overall operation of the first base station system 100. The first processing unit 130 may perform computation, determination and/or control operations by executing the application stored in the first data storage 123. The first processing unit 130 may be implemented using, for example, a central processing unit (CPU), a micro controller unit (MCU), an application processor (AP), a micro processor (Micom), an electronic controlling unit (ECU) and/or other electronic devices capable of performing various types of computational processing and generating a control signal. Such apparatuses may include, for example, at least one or two semiconductor chips and related parts.

According to an example embodiment, the first processing unit 130 may collect an energy dispatch policy about each of the systems 100, 200, and 200-1 from at least one of the first base station system 100 and the second base station systems 200 and 200-1 and may determine a global energy dispatch policy based on the collected energy dispatch policies. Here, the global energy dispatch policy may include an energy dispatch policy about all of or a portion of the base station systems 100, 200, and 200-1 present over the network of the energy management system 10. According to an example embodiment, the first processing unit 130 may determine a management method for not independent identically distributed energy consumption and energy generation of the first base station system 100 and/or each second base station system 200 using at least one learning algorithm (e.g., an LSTM). In this case, the first processing unit 130 may use a learning algorithm once and may also use the learning algorithm several times. In the latter case, the first processing unit 130 may use only the same learning algorithm and may also use at least two different learning algorithms. Each of the first base station system 100 and/or the second base station system 200 may perform a management operation for energy generation and demand depending on determination and decision results. In detail, for example, the second base station system 200 may perform a management operation for the energy generation and demand by receiving a parameter about a neural network from the first processing unit 130 and by determining an energy dispatch based on the received parameter about the neural network. A parameter transfer may be performed through the first communicator 121 and the second communicator 221. An energy management operation of the first base station system 100 may be performed in such a manner that the first processing unit 130 directly determines the energy dispatch based on the parameter about the neural network. Depending on example embodiments, an operation of determining the energy dispatch based on the parameter about the neural network may be performed by another server apparatus (not shown) in addition to the first processing unit 130. Further description related thereto is made below.

According to an example embodiment, the first data collector 190 may collect at least one piece of data required for energy management from at least one of the first base station unit 101, the first energy generator 102, and the first energy storage 103 and may transfer the collected data to the first processing unit 130. For example, the first data collector 190 may acquire information about energy consumption of the first base station system 100. In detail, the first data collector 190 may acquire information about energy consumption of the first energy management unit 110 or another computing apparatus to perform the edge computing function or energy consumption of the first base station unit 101. The energy consumption of the first energy management unit 110 or the other computing apparatus to perform the edge computing function may include two types of energy consumption, such as dynamic energy consumption and static energy consumption. Here, the dynamic energy consumption refers to energy consumption that varies according to activity of a processing device (e.g., a central processing device) for a task execution, and may apply to thermal design power (TDP), a memory, and/or disk I/O tasks. An amount of the dynamic energy consumption may vary according to an amount of data transmitted to an external device or from the external device. The static energy consumption may include energy consumption such as idle status power of a processing device, predetermined energy consumption for receiving a packet, and energy consumption for wired and wireless communication between the respective base station units 101 and 201. Energy that is consumed in the first base station system 100 may be supplied from the first energy generator 102 or the power grid 9. In the case of collecting at least one piece of data required for energy management, the first processing unit 130 may perform operations, such as status selection (231 of FIG. 3), action determination (232 of FIG. 3), reward calculation (234 of FIG. 3), and/or function or gradient estimation (235 and 236 of FIG. 3) as a method identical to or partially modified from the following second processing unit 230. Also, the first processing unit 130 may perform operations, such as optimization (132 of FIG. 3), determination (134 of FIG. 3), and/or loss evaluation (136) based on information directly acquired by the first processing unit 130 and may also determine an energy dispatch policy about the first base station system 100.

According to an example embodiment, any one second base station system 200 may include the second base station unit 201, a second energy generator 202, a second energy storage 203, and a second energy management unit 210.

Similar to the first base station unit 101, the second base station unit 201 may transmit and receive signals to and from other base stations 100 and 200-1 through electric waves. In this case, the second base station unit 201 may be provided to perform communication by including relatively narrow range compared to that of the first base station unit 101. For example, the second base station unit 201 may be a small cell base station (sbs) and, in detail, may include at least one of a femtocell base station, a picocell base station, a microcell base station, and a wireless fidelity (Wi-Fi) router. However, it is provided as an example only. Depending on example embodiments, the second base station unit 201 may communicate with the first base station unit 101 or the first communicator 121. In this case, the second communicator 221 may be omitted.

The second energy generator 202 is configured to generate energy by itself and to provide the generated energy to the second base station unit 201 or transfer the generated energy to the second energy storage 203. The second energy generator 202 may be implemented using an energy production apparatus, for example, a power generator, and may be implemented using the aforementioned alternative energy power generator. For example, the second energy generator 202 may be implemented using a solar power generator or a wind power generator. In this case, the second energy generator 202 may be implemented using the same power generator as that of the first energy generator 102 or may be implemented using a generator different therefrom. Electrical energy produced by the second energy generator 202 may be inconsistent and may be variable over time.

Similar to the first energy storage 103, the second energy storage 203 may transitorily or non-transitorily store the electrical energy generated by the second energy generator 202 and may be implemented using a battery and the like. Also, depending on example embodiments, the second energy storage 203 may connect to the power network controller 2 or the power grid 9 and may supply the electrical energy or may be supplied with the electrical energy to or from the power network controller 2 or the power grid 9.

The second energy management unit 210 may perform at least one operation, such as, for example, collecting a variety of data required for an operation of the second station system 200, performing computational processing, acquiring data corresponding to computation results, transferring the acquired data to the first energy management unit 110, performing processing required for energy management based on the acquired data or the data transferred from the first energy management unit 110, performing learning and training using a learning algorithm, and/or generating a control signal based on learning results or acquired data and controlling at least one of the second base station unit 201, the second energy generator 202, and the second energy storage 203. All or a portion of operations or functions of the second energy management unit 210 may be identical to or differ from operations or functions of the first energy management unit 110. Depending on example embodiments, the second energy management unit 210 may perform an edge computing function. Alternatively, another computing apparatus separate from the second energy management unit 210 may perform the edge computing function.

Similar to the first energy management unit 110, the second energy management unit 210 may also be implemented using at least one computing apparatus (i.e., a second energy management apparatus) physically separate from the second base station unit 201, the second energy generator 202, and the first energy storage 203. Also, the second energy management apparatus may be implemented using, for example, a server computer, a desktop computer, a laptop computer, a smartphone, a cellular phone, a tablet PC, a set-top box, and an electronic device specially designed for energy management. However, it is provided as an example only.

Referring to FIG. 2, according to an example embodiment, the second energy management unit 210 may include the second communicator 221, a second data storage 223, a second processing unit 130, and a second data collector 290. A portion thereof may be omitted.

The second communicator 221 may transmit and receive data or an instruction to and from another external apparatus or the first base station system 100 through a wired or wireless communication network. In this case, the second communicator 221 may communicate with the first communicator 121 and may also communicate with the first base station unit 101. Depending on example embodiments, the second communicator 221 may be omitted.

The second data storage 223 may transitorily or non-transitorily store data collected by the second data collector 290, data (e.g., a neural network parameter) transferred from the first energy management unit 110, at least one application required for an operation of the second base station system 200 or a learning algorithm related thereto (e.g., an LSTM, deep reinforcement learning, etc.) and may provide necessary data to the second processing unit 230 in response to call from the second processing unit 230. Similar to the first data storage 123, the second data storage 223 may also include a main memory device or an auxiliary memory device.

The second processing unit 230 may perform computational processing and control operations related to energy management of the second base station system 200. Also, to this end, the second processing unit 230 may perform learning and training based on a learning algorithm. In detail, the second processing unit 230 may classify and identify Markovian dynamics for energy demand and generation of each of the second base station processing system 200 and the second base station unit 201 based on the learning algorithm, such as deep reinforcement learning. Also, the second processing unit 230 may transfer data (observation results) acquired over time to the first energy management unit 110 through the second communicator 201, and may execute the energy dispatch policy based on feedback transferred from the first energy management unit 110 and may generate a control signal corresponding thereto.

The second data collector 290 may collect information associated with energy production or consumption of the second base station system 200. For example, the second data collector 290 may collect information about energy consumed by the second base station unit 201, the second energy management unit 210, or another computing apparatus to perform an edge computing function. The collected information may be transferred to the second processing unit 230 or may be transferred to the first energy management unit 110 through the second communicator 221. As described above, energy consumed by the second energy management unit 210 may include dynamic energy consumption and static energy consumption.

Similar to the aforementioned one second base station system 200, the other second base station system 200-1 may include a second base station unit (not shown), a second energy generator (not shown), a second energy storage (not shown), and a second energy management unit (a second energy management apparatus, not shown), or may include only a portion thereof. Also, depending on example embodiments, the other second base station system 200-1 may further include another apparatus or part absent in the second base station system 200. Energy demand or production of the other second base station system 200-1 may also vary over time and may also be identical to or differ from the aforementioned energy demand or production of the second base station system 200.

Referring to FIG. 1, according to an example embodiment, the energy management system 10 may connect to at least one of the power network controller 2 and the power grid 9. In detail, for example, the energy generator 102, 202 or the energy storage 103, 203 of the first base station system 100 and/or the second base station system 200 may connect to the power network controller 2 and/or the power grid 9 through a power transmission cable.

The power network controller 2 may operate as an interface between the energy management system 10 and the power grid 9. In detail, for example, the power network controller 2 may be configured to perform management and control to supply energy from the power grid 9 to the energy management system 10, for example, each of the base station systems 100, 200, and 200-1 in response to a power demand request from a network 11 or to supply energy from the energy management system 10, for example, at least one of the base station systems 100, 200, and 200-1 to the power grid 9 or another apparatus in response to a request from an outside. Depending on example embodiments, the power network controller 2 may also perform the functionality of distribution system operators (DSO).

The aforementioned energy management system 10 or energy management apparatuses 110 and 210 may apply to network infrastructures in various fields. For example, the aforementioned energy management system 10 or energy management apparatuses 110 and 210 may apply to various network platforms that require cost effective and sustainable energy, such as a cellular network, an underwater network, and Internet of things (IoT), and thereby used. Here, the network platforms may include, for example, a smart city, a smart factory, a smart medical system, a smart energy system, a smart agriculture, and/or a mission critical infrastructure (e.g., a mining network). However, it is provided as an example only. In addition, the aforementioned energy management system 10 or energy management apparatuses 110 and 210 may apply to an integrated platform, such as, for example, DSO managing a hybrid energy source infrastructure.

The aforementioned energy demand of the first base station unit 101 or the first energy management unit 110 of the first base station system 100 is not consistent at all times and varies over time. The same description also applies to the energy demand of the second base station unit 201 or the second energy management unit 120 of the second base station system 200. Also, as described above, energy generation patterns by the first energy generator 102 or the second energy generator 202 vary over time. The variability of energy production and demand patterns over time induces a dependent identically distributed energy dispatch and reinforces the uncertainty of energy flow. The first energy management unit 110 and the second energy management unit 210 may guarantee the energy flow in the first base station system 100 and the second base station system 200 by characterizing a degree of uncertainty.

Hereinafter, a process of performing, by the first energy management unit 110 and the second energy management unit 210, energy management through learning and training is described with reference to FIG. 3.

Figure 3:
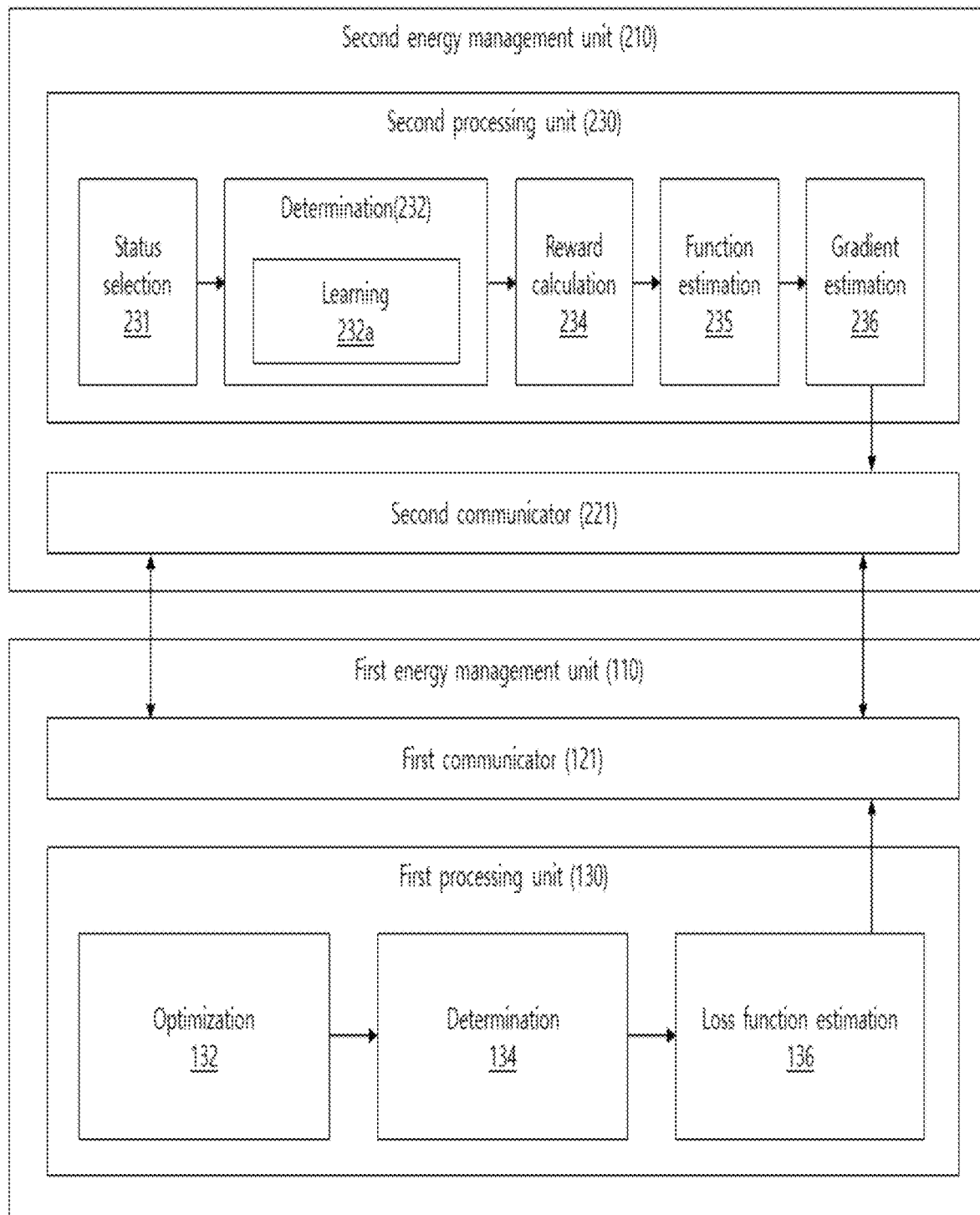
FIG. 3 is a block diagram illustrating an example of an operation of a first energy management unit and a second energy management unit.

FIG. 3 is a block diagram illustrating an example of an operation of a first energy management unit and a second energy management unit.

According to an example embodiment, at least one of the first energy management unit 110 and the second energy management unit 120 may perform energy management within the energy management system 10 using reinforcement learning. At least one agent (e.g., the first energy management unit 110 and the second energy management unit 210) under reinforcement learning repeatedly performs acquiring its status at a specific point in time, determining and performing an available action under this status, and acquiring a new status and a reward based on performance results. The reward may be accumulated and the agent may acquire desired results by maximizing the accumulated reward.

In detail, according to an example embodiment of FIG. 3, the second processing unit 230 of the second energy management unit 210 may receive, from the second data collector 290, data collected by the second data collector 290 (e.g., data related to an energy environment), may select a status required for learning based on the received data, and may generate status information corresponding thereto (e.g., a status space) (231) to perform reinforcement learning. Generation of status information may be performed based on an energy model, such as prediction scheduling or load balancing. If necessary, data preprocessing may also be performed.

In a sequential manner, a policy (e.g., an energy dispatch policy) corresponding to energy production and demand may be determined and/or a necessary operation may be determined (232).

According to an example embodiment, such determination may be performed through learning and training using a desired learning algorithm (232a). In this case, learning may be performed using data (e.g., a parameter related to a neural network) transferred from the first energy management unit 110 or may be performed without using data transferred from the first energy management unit 110, which is described below. For example, in the case of initially determining the energy dispatch policy, learning may be performed based on data acquired by the second processing unit 230 without using data transferred from the first energy management unit 110, which is similar to the latter case. Also, learning (232a) may be performed by further using the determined operation and calculated reward. For example, the respective operations 231 to 236 of the second processing unit 230 may be repeatedly performed. Accordingly, operation 233 and reward 234 may be determined before performing learning 232a at a present time. Learning 232a may be performed using operation 233 and reward 234 determined before performing learning 232a. A learning algorithm may include at least one of, for example, an LSTM, a deep reinforcement learning algorithm, a deep neural network (DNN), a convolution neural network (CNN), a recurrent neural network (RNN), a deep belief network (DBN), and/or a learning algorithm considerable by a designer such as a deep Q-network. Determination of an action may be performed during learning or training and may also be performed after learning or training. Determination of an action may be selected for exploration during training. For determination of an action, a pretrained neural network algorithm or various types of statistical algorithms may be used in a predetermined or arbitrary manner. As described above, the determined action may be used for learning 232a.

If the action is determined, a reward corresponding thereto may be calculated (234). The reward may be determined to correspond to an action in a predetermined status in reinforcement learning and may be calculated using a reward model (a reward function). The reward model may be defined or determined before determining the reward and may be defined or determined by considering the purpose of determining an energy dispatch. The reward may be differently determined based on a given energy model (e.g., prediction, scheduling, and load balancing). The reward may be a long-term reward or a short-term reward depending on a reward model used. Depending on example embodiments, the reward may be delayed and thereby processed based on energy requirements or priority.

Also, at least one function may be estimated and determined (235). Here, the at least one function may include at least one of a value function and an advantage function. Estimation of the value function may be performed based on a reward expectation value function. The reward expectation value function is based on Bellman equation and Markovian property is characterized for variable energy demand and production of the second energy management unit 210 over time. Also, estimation of the advantage function may be performed using a temporal difference. Here, a temporal difference (TD) error may be determined based on a current energy dispatch policy and value estimation. Therefore, the second processing unit 230 may calculate a benefit about the current determination. In addition, the value function and the advantage function may be estimated using various methods according to a selection from the user or the designer. Also, if necessary, the second processing unit 230 may estimate another function in addition to the value function or the advantage function.

Also, the second processing unit 230 may determine a policy gradient to find an optimal energy dispatch policy. The policy gradient may be used to individually update an energy dispatch policy for each of the second energy management units 210 and 210-1 and may determine the distribution (status distribution) about an unknown status.

The aforementioned respective operations of the second processing unit 230, for example, status selection (231), determination (232), reward calculation (234), function estimation (235), and gradient estimation (236) may be repeatedly performed within a predetermined time slot. Here, the predetermined time slot may include a period (an observation period) during which the second processing unit 230 collects and observes data about operations of the respective apparatuses (e.g., 201, 202, and 203) included in the second base station system 100. The observation period may be determined based on a selection from the user or the designer. For example, the observation period may be determined as 15 minutes, 60 minutes, or more. In this case, learning (232a) and determination (232) of the final energy dispatch policy based on learning (232a) may be performed at a time at which the time slot ends.

The aforementioned operation of the second processing unit 230 may also apply to a processing unit of the other second energy management unit 210-1. That is, the aforementioned status selection (231), determination (232), reward calculation (234), function estimation (235), and gradient estimation (236) may be sequentially or non-sequentially performed for each of the second energy management units 210 and 210-1. According to an example embodiment, all of the second energy management units 210 and 210-1 in the energy management system 10 may perform each of the operations 231 to 236. According to another example embodiment, only some second energy management units among the plurality of second energy management units 210 and 210-1 included in the energy management system 10 may perform the aforementioned operations 231 to 236 and other some second energy management units may not perform all of or a portion of the aforementioned operations 231 to 236.

Information acquired by the second processing unit 230 may be transferred to the first processing unit 130 of the first energy management unit 110 through the communicators 221 and 121. In this case, the transferred information may include data (observation data) acquired through observation of the second processing unit 230. For example, the transferred information may include at least one of a reward in a present status (which may include a discounted reward according to a depreciation rate), a reward in a subsequent status (which may include the same discounted reward), a current action, a subsequent action, a time slot (e.g., an observation period), and a time difference (TD) error (i.e., an advantage).

According to an example embodiment, transferring of information (e.g., observation data) to the first energy management unit 110 may be performed after a specific time slot ends. In detail, for example, the second processing unit 230 may continuously repeated the aforementioned operations 231 to 236 during a predetermined observation period (e.g., 15 minutes, 60 minutes, or more), and if the observation period elapses, may transfer the acquired information to the first energy management unit 110. In this case, information transferred to the first energy management unit 110 may include information (i.e., observation data) at an end point in time of the time slot (i.e., a point in time at which the observation period ends). Depending on example embodiments, the second processing unit 230 may transfer information to the first energy management unit 110 regardless of the observation period. Also, according to an example embodiment, transferring of information acquired by the second processing unit 230 may be asynchronously performed. That is, although the second processing unit 230 acquires and updates information, the acquired and updated information may not be transferred to the first energy management unit 110 whenever information is acquired and updated. According to another example embodiment, transferring of information acquired by the second processing unit 230 may be synchronously performed. That is, information acquired by the second processing unit 230 may be transferred to the first processing unit 130 immediately or within a desired period of time every time information is acquired.

The first processing unit 130 may perform learning and training using information, that is, observation data, transferred from the second energy management unit 210. In detail, the first processing unit 130 may optimize a neural network parameter using information transferred from the second base station system 200 (132). In detail, for example, the first processing unit 130 may update a policy gradient about each second base station system 200 based on information synchronously or asynchronously received from the second processing unit 230. Also, the first processing unit 130 may estimate an entropy loss or a loss gradient based on information transmitted from the second processing unit 230. In addition, the first processing unit 130 may generate self-status information to maintain long-term dependency and may use the generated self-status information to optimize a neural network parameter. Optimization of a parameter may be performed using a predetermined learning algorithm (e.g., an LSTM). According to an example embodiment, the first processing unit 130 may also perform learning using the same type of a learning algorithm as that of a learning algorithm of the second processing unit 230. In this case, the learning algorithms of both the processing units 130 and 230 may be formed in cells with the same size. Depending on example embodiments, the learning algorithm of the first processing unit 130 may differ from the learning algorithm of the second processing unit 130. Also, the first processing unit 130 may perform learning using a single learning algorithm and may also perform learning using a plurality of learning algorithms. Depending on example embodiments, the first processing unit 130 may perform learning using a plurality of different learning algorithms.

The first processing unit 130 may sequentially or non-sequentially determine a global energy dispatch policy for the apparatuses 100, 200, and 200-1 in the system 10 (134). The first processing unit 130 may use a separate advantage function to determine the global energy dispatch policy. The advantage function may be executed based on observation results (data) of each second energy management unit 210. Also, the first processing unit 130 may estimate a function (a policy loss function) about a policy loss of the system 10 to determine an optimal neural network parameter. In detail, for example, the first processing unit 130 may estimate a gradient of the policy loss function (136). Estimation of the policy loss function may be performed using a gradient descent scheme or a stochastic gradient descent scheme. A neural network parameter acquired by the first processing unit 130 may be transferred to the second processing unit 230 through the communicators 121 and 221. Transmission of the neural network parameter may be periodically performed or may be aperiodically performed. If the neural network parameter is periodically transmitted, a parameter transmission interval may be differently determined based on a learning model and a goal of a dispatch policy.

According to the aforementioned operation, the first processing unit 130 may acquire a global neural network parameter.

If the neural network parameter is received, the second processing unit 230 of the second energy management unit 210 may perform learning based on the neural network parameter (232a), and may determine a policy corresponding to energy production and demand and/or determine a necessary operation based on the learning. In this case, the second energy management unit 210 may determine a self-energy dispatch policy based on the received neural network parameter after a predetermined time slot (e.g., an observation period) ends.

The aforementioned operations 132, 134, and 136 of the first processing unit 130 may be asynchronously performed with operations 231 to 236 of the second processing unit 230.

Hereinafter, various example embodiments of an energy management method are described with reference to FIG. 4.

Figure 4:
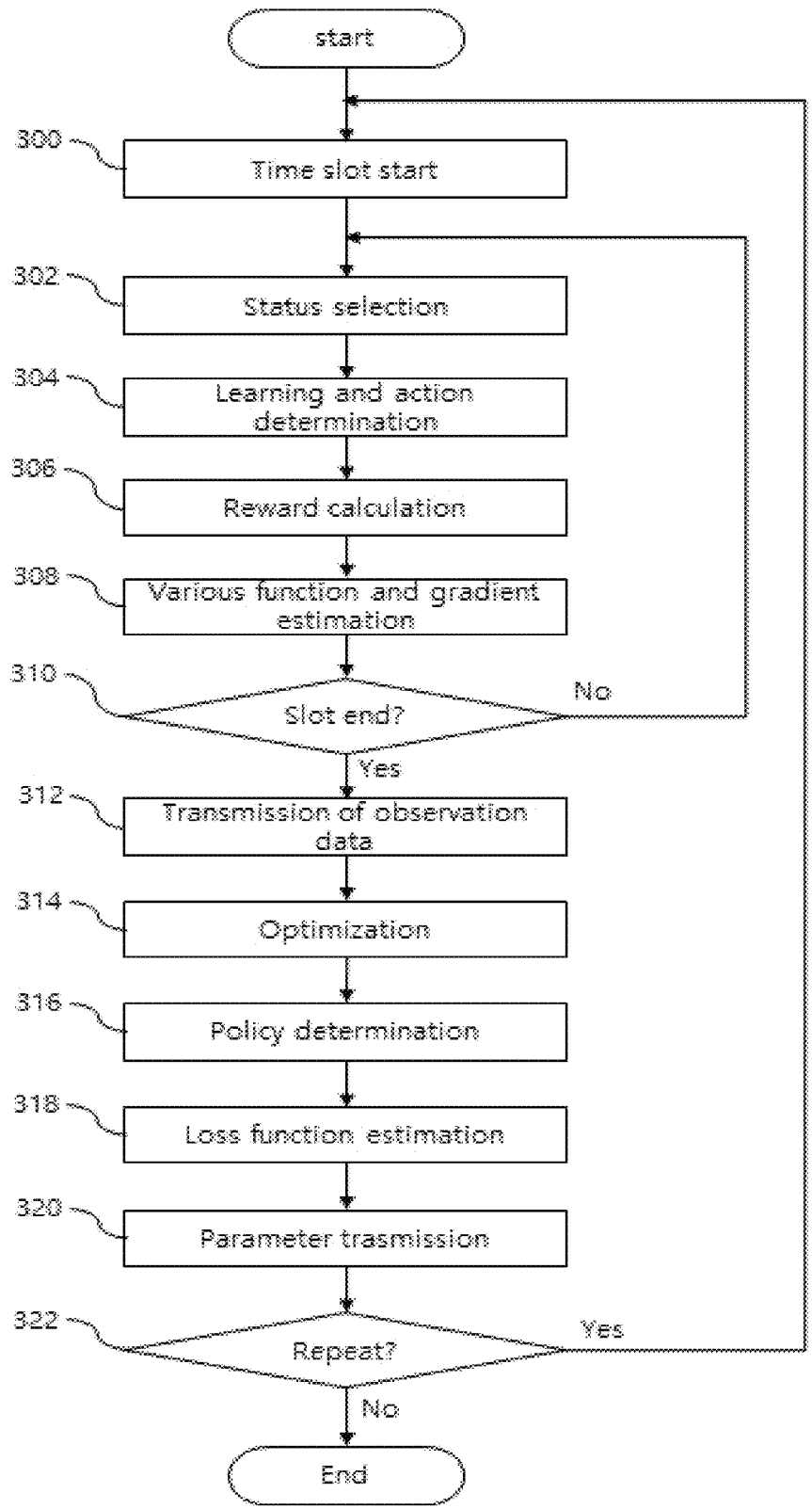
FIG. 4 is a flowchart illustrating an example embodiment of an energy management method.

FIG. 4 is a flowchart illustrating an example embodiment of an energy management method.

Referring to FIG. 4, a time slot starts (300). Progress and elapse of the time slot may be performed by a second processing unit of a second base station system that includes relatively small coverage and, if necessary, may be performed by a first processing unit of a first base station system. If it is processed by all of the first processing unit and the second processing unit, corresponding time slots may have the same length and may be designed to start at the same time and to end at the same time. The time slot may include an observation period and the observation period may be variously determined as, for example, 15 minutes, 60 minutes, or more, in response to a selection from the user or the designer.

The first processing unit of the first base station system and/or the second processing unit of at least one second base station system may determine a status based on collected data and may generate status information corresponding to the determined status. Here, the status information may refer to information used to perform reinforcement learning. The status information may be performed based on a model, such as prediction scheduling or load balancing. In addition, data preprocessing may be performed with status selection.

In a sequential manner, learning or training may be performed based on the status information and an operation may be determined during the progress of learning or training, or after termination of learning or training (304). Also, learning or training may be performed using an operation and a reward acquired in advance by the second processing unit during an iteration process (310, 322). Depending on example embodiments, learning or training may be performed by further using a parameter related to a neural network transferred from a first energy management unit of the first base station system. Learning or training may be processed based on a predetermined single learning algorithm or at least two learning algorithms. Here, the learning algorithm may include, for example, a single or at least two of an LSTM, deep reinforcement learning, and an RNN.

If an action is determined, a reward corresponding to the determined action may be calculated and determined (306). The reward may be calculated using a reward model and reward calculation results may vary based on a reward model used. Depending on example embodiments, the reward model may be determined in advance or may be determined during performing of the energy management method.

At least one function or policy gradient required for learning may be calculated and estimated at the same time of calculating the reward or at a different time (308). For example, estimation of the function or the policy gradient may be performed after calculation of the reward is terminated. Here, at least one function may include at least one of a value function and an advantage function. The function may include at least one of the value function and the advantage function. According to an example embodiment, the value function may be performed using a reward expectation value function based on Bellman equation and the advantage function may be estimated based on temporal difference. However, it is provided as an example only.

Through the aforementioned process, observation data, such as, for example, a current action, a reward corresponding to the current action, information related to a time slot, the value function, the advantage function and/or other information required for operating the first energy management unit, may be acquired. Also, at least one of a subsequent action and a reward corresponding to the subsequent action may be further acquired through the following repetitive operation (310).

In a sequential manner, whether the time slot ends may be determined (310). If the time slot does not end due to insufficient elapse of time (no of 310), status selection (302), learning and action determination (304), reward calculation (308), and various function and gradient estimation process (308) may be repeatedly performed. On the contrary, if the time slot ends (yes of 310), information (i.e., observation data) acquired by a second energy management unit may be transferred to the first energy management unit through a wired or wireless communication network (312). Transmission of the observation data may be asynchronously performed or may be synchronously performed.

The first energy management unit of the first base station system may receive observation data from the second energy management unit and may perform learning and training using the observation data. In this case, the first energy management unit may receive observation data from all of the second energy management units within an energy management system or may also receive observation data from a portion of the second energy management units within the energy management system.

The first processing unit of the first energy management unit may optimize a neural network parameter (314). In detail, the first processing unit may update a policy gradient about the second base station system, or may estimate an entropy loss or a loss gradient based on information received from the second energy management unit, or may also acquire self-status information. Optimization of the neural network parameter may be performed using a single learning algorithm or at least two learning algorithms. Here, the learning algorithm may include an LSTM, deep reinforcement learning, or an RNN. Depending on example embodiments, a learning algorithm of the first processing unit may be identical to or differ from a learning algorithm of the second processing unit of the second energy management unit. For example, the learning algorithm of the first processing unit and the learning algorithm of the second processing unit may be a deep reinforcement learning algorithm including cells with the same size.

Also, the first processing unit of the first energy management unit may determine a global energy dispatch policy and, to this end, may use a predetermined advantage function (316). Determination of a policy may be performed together with the optimization process (314) or in a sequential manner.

Also, the first processing unit of the first energy management unit may estimate a policy loss function and, in detail, may estimate a gradient of the policy loss function (318). The policy loss function estimation process (318) may be performed simultaneously or sequentially with the optimization process (314) or the policy determination process (316).

Accordingly, the first energy management unit may acquire a global neural network parameter to be used by each base station system within the energy management system. The acquired parameter may be transmitted to each corresponding second energy management unit of the second base station system (320).

Depending on example embodiments, the aforementioned process (300 to 320) may be continuously repeated (yes of 322).

The energy management method according to the example embodiments may be implemented in a form of a program executable by a computer apparatus. Here, the program may include, alone or in combination with program instructions, data files, data structures, and the like. The program may be designed and manufactured using a machine language code or a higher level code. The program may be specially designed to implement the aforementioned method and may be implemented using functions or definitions well-known and available to one of ordinary skill in the computer software arts. Also, a computer apparatus may include a processor, a memory, and the like, to implement functions of the program, and, if necessary, may further include a communication apparatus.

The program for implementing the energy management method in a self-powered network may be recorded in non-transitory computer-readable media. Examples of the media may include, for example, semiconductor storage devices, such as solid state drive (SSD), read only memory (ROM), random access memory (RAM), flash memory, and the like; magnetic disc storage media, such as hard discs and floppy discs; optical media such as compact discs and DVDs; magneto-optical media such as floptical discs; magnetic tapes, and at least one physical device that is specially configured to store a specific program executed in response to call of a computer.

Although a number of example embodiments regarding the method, apparatus, and system for managing energy in the self-powered network have been described above, the method, apparatus, and system for managing energy in the self-powered network are not limited thereto. Various apparatuses or methods achieved by one of ordinary skill in the art through alterations and modifications based on the example embodiments may be determined as the aforementioned method, apparatus, and system for managing energy in the self-powered network. For example, although the described techniques are performed in different order and/or although components in a described system, architecture, apparatus, or circuit are combined in a different manner or replaced or supplemented by other components or their equivalents, they may be an example embodiment of the aforementioned method, apparatus, and system for managing energy in the self-powered network.

| EXPLANATION OF SYMBOLS | |
| --- | --- |
| 2: Power network controller | 9: Power grid |
| 10: Energy management system | 100: First base station system |
| 101: First base station unit | 102: First energy generator |
| 103: First energy storage | 110: First energy management unit |
| 130: First processing unit | 200: Second base station system |
| 201: Second base station unit | 202: Second energy generator |
| 203: Second energy storage | 210: Second energy management unit |
| 230: Second processing unit | |

What is claimed is:

1. An energy management system comprising:
a first energy management unit; and
at least one second energy management unit configured to be communicable with the first energy management unit,
wherein the at least one second energy management unit is configured to acquire observation data using collected data and to transmit the acquired observation data to the first energy management unit,
the first energy management unit is configured to acquire a global neural network parameter by performing learning based on the observation data, and to transfer the neural network parameter to the second energy management unit, and
the at least one second energy management unit is configured to determine an energy dispatch by performing learning using the neural network parameter and the collected data,
wherein the at least one second energy management unit is configured to select a status based on the collected data, to determine an action and a reward corresponding to the action by performing learning based on the selected status, and to transmit the action and the reward to the first energy management unit,
wherein the at least one second energy management unit is configured to estimate a policy gradient configured to be used to individually update an energy dispatch policy for the at least one second energy management unit by determining a distribution status of an unknown status, and
wherein the at least one second energy management unit is further configured to estimate an advantage function based on temporal difference and a temporal difference (TD) error, which is determined based on the updated energy dispatch policy and value estimation.

2. The energy management system of claim 1, wherein the at least one second energy management unit is further configured to estimate a value function based on Bellman equation, in which Markovian property is characterized for a variable energy demand and production of the at least one second energy management unit.

3. The energy management system of claim 1, wherein the at least one second energy management unit is configured to iteratively acquire observation data during a predetermined time slot and to transmit, to the first energy management unit, observation data of an end point in time when the time slot ends.

4. The energy management system of claim 1, wherein the first energy management unit is configured to evaluate a policy loss using a gradient descent scheme or a stochastic gradient descent scheme, and wherein estimating of the policy loss is performed simultaneously with updating the energy dispatch policy.

5. The energy management system of claim 1, comprising at least one of:
at least one base station unit configured to connect to the at least one second energy management unit, to communicate with an external apparatus, and to consume energy; and
an energy generator configured to connect to the at least one second energy management unit and to produce alternative energy.

6. The energy management system of claim 1, wherein the first energy management unit is configured to connect to at least one of at least one base station unit that consumes energy for communication with an outside and an energy generator that generates alternative energy, to perform learning using data collected from at least one of the base station unit and the energy generator, to acquire a global neural network parameter by performing learning based on information acquired according to learning performance, and to determine an energy dispatch by performing learning using the neural network parameter.

7. An energy management apparatus comprising:
a communicator configured to receive observation data from an external energy management apparatus; and
a processing unit configured to acquire an optimized neural network parameter for a learning algorithm about determination of an energy dispatch policy based on the observation data,
wherein the communicator is configured to transmit the neural network parameter to the external energy management apparatus,
wherein the processing unit is configured to acquire the optimized neural network parameter by evaluating a gradient of a policy loss function, which is configured to be used to individually update the energy dispatch policy by determining a distribution status of an unknown status, and
wherein the processing unit is configured to estimate an advantage function based on temporal difference and a temporal difference (TD) error, which is determined based on the updated energy dispatch policy and value estimation.

8. An energy management apparatus comprising:
a data collector configured to collect data about production and demand of energy;
a processing unit configured to acquire observation data based on the data collected by the data collector; and
a communicator configured to transmit the observation data to an energy management apparatus and to receive a neural network parameter from an external energy management apparatus,
wherein the processing unit is configured to perform learning using the neural network parameter,
wherein the processing unit is configured to estimate a policy gradient configured to be used to individually update an energy dispatch policy by determining a distribution status of an unknown status, and
wherein the processing unit is configured to estimate an advantage function based on temporal difference and a temporal difference (TD) error, which is determined based on the updated energy dispatch policy and value estimation.

9. The energy management apparatus of claim 8, wherein the processing unit is configured to select a status using the collected data and to determine an action and a reward corresponding to the action by performing learning based on the selected status.

10. The energy management apparatus of claim 8, wherein the processing unit is configured to iteratively acquire the observation data during a predetermined time slot, and
the communicator is configured to transmit the observation data to the external management apparatus after the time slot ends.

11. The energy management apparatus of claim 8, wherein the processing unit is further configured to estimate a value function based on Bellman equation, in which Markovian property is characterized for a variable energy demand and production of the energy management apparatus.

12. An energy management method comprising:
collecting data about energy demand and production;
acquiring observation data based on the data;
acquiring a global neural network parameter used by a plurality of energy management apparatuses by further performing learning using the observation data; and
determining an energy dispatch policy of each energy management apparatus by further performing learning using the global neural network parameter and the collected data,
wherein the acquiring of the observation data based on the data comprises:
estimating a policy gradient configured to individually update the energy dispatch policy by determining a distribution status of an unknown status; and
estimating an advantage function based on temporal difference and a temporal difference (TD) error, which is determined based on the updated energy dispatch policy and value estimation.

13. The energy management method of claim 12, wherein the acquiring of the observation data based on the data comprises:
selecting a status based on the data; and
determining an action and a reward corresponding to the action by performing learning based on the selected status.

14. The energy management method of claim 13, wherein the acquiring of the observation data based on the data further comprises:
estimating a value function based on Bellman equation, in which Markovian property is characterized for a variable energy demand and production of the energy management apparatus.

15. The energy management method of claim 12, further comprising:
continuously repeating the collecting of the data about the energy demand and production and the acquiring of the observation data based on the data during a predetermined time slot.

16. The energy management method of claim 12, wherein the collecting of the data about the energy demand and production and the acquiring of the observation data based on the data is performed by a second apparatus, and
the acquiring of the global neural network parameter used by the plurality of energy management apparatuses by further performing learning using the observation data is performed by a first apparatus different from the second apparatus.

17. The energy management method of claim 16, further comprising:
transmitting the observation data from the second apparatus to the first apparatus; and
transmitting the global neural network parameter from the first apparatus to the second apparatus.

* * * * *